(12) United States Patent
Shelton

(10) Patent No.: US 7,094,110 B1
(45) Date of Patent: Aug. 22, 2006

(54) COMPUTER DISCONNECT DEVICE

(75) Inventor: Kevin M. Shelton, Fall City, WA (US)

(73) Assignee: Net 7 Technologies, Inc., Maple Valley, WA (US)

( * ) Notice: Subject to any disclaimer, the term of this patent is extended or adjusted under 35 U.S.C. 154(b) by 0 days.

(21) Appl. No.: 11/350,341

(22) Filed: Feb. 8, 2006

(51) Int. Cl.
*H01R 24/00* (2006.01)

(52) U.S. Cl. ................ 439/660; 439/676; 379/380; 379/93.05; 713/300

(58) Field of Classification Search ........... 439/660, 439/626, 676; 379/93.05, 380; 713/300
See application file for complete search history.

(56) References Cited

U.S. PATENT DOCUMENTS

| | | | |
|---|---|---|---|
| 3,879,579 A | 4/1975 | Fretwell | |
| 5,434,628 A | 7/1995 | Spiero et al. | |
| 5,694,335 A | 12/1997 | Hollenberg | |
| 6,006,351 A | 12/1999 | Peretz et al. | |
| 6,058,169 A | 5/2000 | Bramnick et al. | |
| 6,088,451 A | 7/2000 | He et al. | |
| 6,272,533 B1 | 8/2001 | Browne | |
| 6,275,946 B1 * | 8/2001 | Meir | 713/300 |
| 6,321,340 B1 * | 11/2001 | Shin et al. | 713/310 |
| 6,341,320 B1 * | 1/2002 | Watts et al. | 710/100 |
| 6,427,140 B1 | 7/2002 | Ginter et al. | |
| 2001/0044843 A1 * | 11/2001 | Bates et al. | 709/224 |
| 2002/0083339 A1 | 6/2002 | Blumenau et al. | |
| 2002/0112171 A1 | 8/2002 | Ginter et al. | |
| 2003/0043737 A1 | 3/2003 | Tada | |
| 2005/0123127 A1 | 6/2005 | Cederberg et al. | |
| 2005/0177716 A1 | 8/2005 | Ginter et al. | |
| 2005/0213300 A1 | 9/2005 | Tran et al. | |

* cited by examiner

*Primary Examiner*—Michael C. Zarroli
(74) *Attorney, Agent, or Firm*—Gregory W. Moravan

(57) ABSTRACT

A computer disconnect device that may have an external communications cable connector; a jumper communications cable connector; a switch; external wiring for connecting the external communications cable connector to the external side of the switch; and jumper wiring for connecting the switch to the jumper communications cable connector. The external communications cable connector may be adapted to be connected to an external communications cable, and a jumper communications cable may be connected between the jumper communications cable connector and a computer. The switch may be used to selectively connect and disconnect the computer and the external communications cable. The computer disconnect device may include a housing, a lock and a status indicator. The external communications cable may be connected to any suitable network, such as the Internet or an intranet, or to any other suitable communications device.

15 Claims, 5 Drawing Sheets

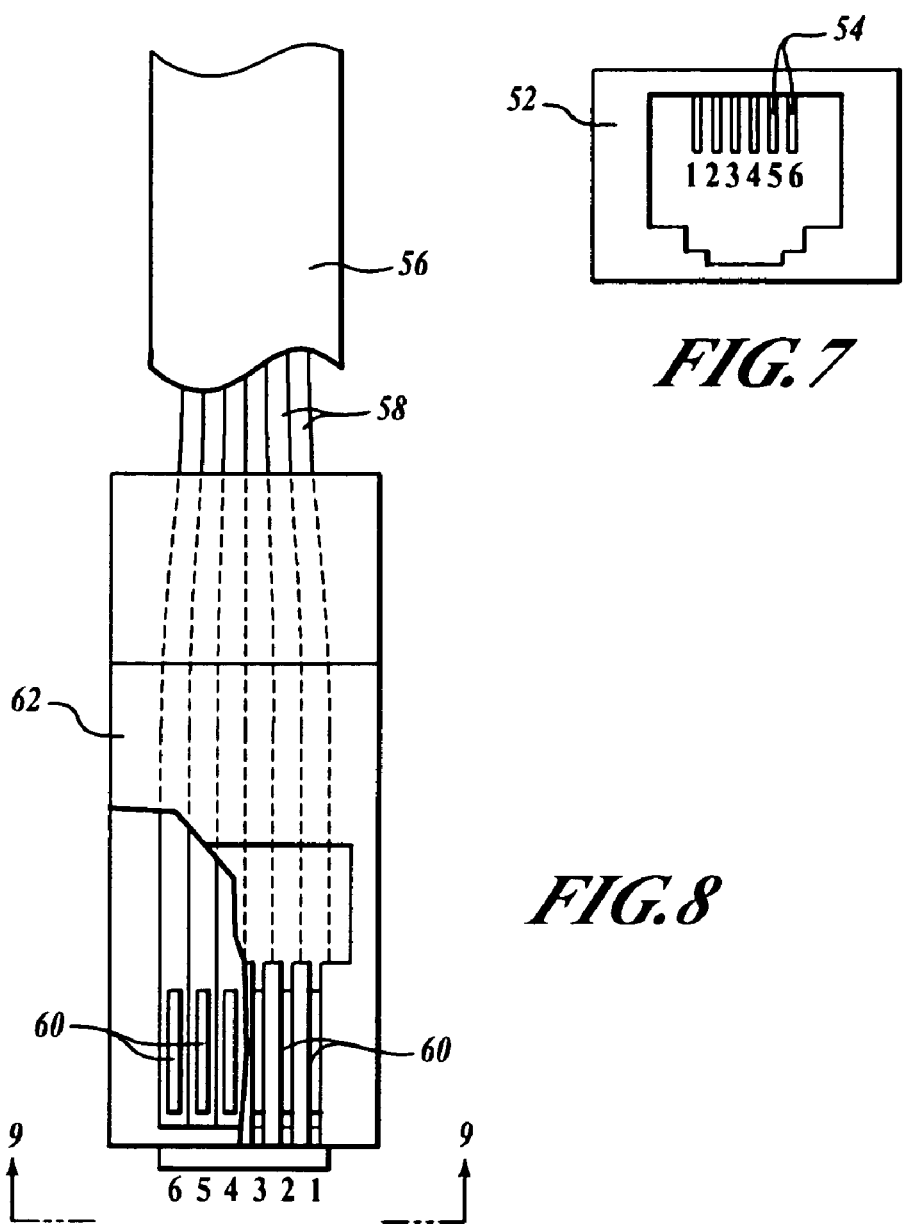
*FIG. 7*
*FIG. 8*
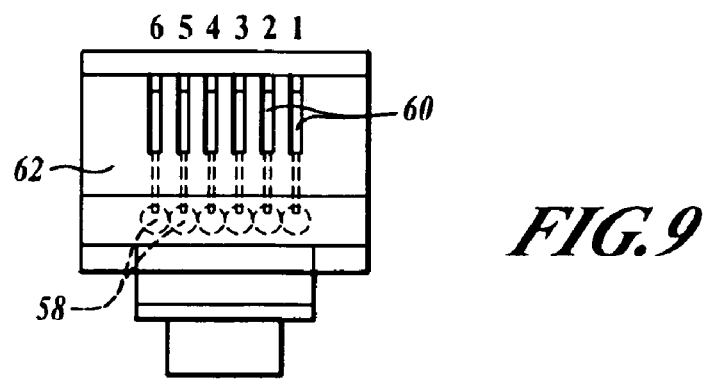
*FIG. 9*

COMPUTER DISCONNECT DEVICE

BACKGROUND OF THE INVENTION

The computer disconnect device of the present invention relates to computer accessory devices. More particularly relates to a computer accessory device that may be used to selectively connect and disconnect a computer from an external communications cable that may provide external communications for the computer with any suitable network or other communications device.

BRIEF SUMMARY OF THE INVENTION

There is a need for a low cost, easy to manufacture and easy to use computer disconnect device for selectively connecting and disconnecting a computer and an external communications cable. The external communications cable (external to the computer, that is), may be connected to any suitable network, such as the Internet or an intranet, or it may be connected to any other suitable communications device.

The computer disconnect device may be needed for many reasons. For example, a parent may use the computer disconnect device to selectively prevent a child from using the computer to connect to an external communications cable when the parent is not present to supervise the child's use of the computer, because of the unsuitable content that the child might otherwise receive or send. Similarly, in a business setting, the computer disconnect device may be used to selectively prevent an employee from using a computer to connect to an external communications cable, to prevent the employee from sending or receiving unauthorized information over that external communications cable. On the other hand, the computer disconnect device may be used to connect the computer to the external communications cable when use of that external communications cable is authorized.

The computer disconnect device may comprise an external communications cable connector; a switch; a jumper communications cable connector; external wiring for connecting the external communications cable connector to the external side of the switch; and jumper wiring for connecting the jumper communications cable connector to the jumper side of the switch. The external communications cable connector may be adapted to be connected to an external communications cable; and the jumper communications cable connector may be adapted to be connected to one end of a jumper communications cable that has its other end connected to a communications port of a computer.

When the switch is in its switch-on status, the external wiring and the jumper wiring are connected together, thereby connecting the communications port of the computer with the external communications cable through the jumper communications cable, the jumper communications cable connector, the jumper wiring, the switch, the external wiring, and the external communications cable connector. When the switch is in its switch-off status the external wiring and the jumper wiring are disconnected from each other, thereby disconnecting the communications port of the computer from the external communications cable.

The computer disconnect device may be used with any suitable external communications cable, such an Ethernet cable or a telephony cable. When used with an Ethernet cable, the Ethernet cable may be used in its lower speed mode (of carrying a signaling rate of up to about 100 megabits per second), or in its higher speed mode (of carrying a signaling rate of up to about 1,000 megabits per second).

An optional lock may be provided for preventing or permitting the switch from being actuated between its switch-on status and its switch-off status; and an optional status indicator may be provided to indicate whether the switch is in its switch-on status or is in its switch off status.

The computer disconnect device may further comprise a housing for some, or all, of the external communications cable connector, the switch; the jumper communications cable connector, the external wiring, and the jumper wiring. Alternatively, some or all of the components of the computer disconnect device may not have a separate housing, in which case some, or all, of the external communications cable connector, the switch; the jumper communications cable connector, the external wiring, and the jumper wiring may be enclosed in the housing of another device, such as a computer keyboard.

The shape of a contact surface of the computer disconnect device's housing may be selected to correspond to the shape of a supporting surface of an object which is to support the computer disconnect device, for easy mounting of the computer disconnect device.

Any suitable permanent or selectively releasable attachment means may be used to secure the computer disconnect device to any suitable support surface of an object. Alternatively, the computer disconnect device may have a weight, and its housing may have a friction contact surface, that may be selected to prevent the computer disconnect device from moving substantially on the object's support surface when the computer disconnect device's switch is actuated.

It should be understood that the foregoing summary of the present invention does not set forth all of its objects, features, advantages, characteristics, structures, materials, methods and processes; since these and further objects, features, advantages, characteristics, structures, materials, methods and processes of the present invention will be directly or inherently disclosed to those of ordinary skill in the art to which it pertains in view of all of the disclosures herein.

BRIEF DESCRIPTION OF THE SEVERAL VIEWS OF THE DRAWING

FIG. 7 is an end elevational view of a female RJ-11 communications cable connector;

FIG. 8 is a is a top plan view of a telephony cable having a male RJ-11 communications cable connector at one end thereof, with the view being partly broken away in certain areas to show internal features; and FIG. 9 is an end elevational view of FIG. 8, taken along line 8—8 thereof

DETAILED DESCRIPTION OF THE INVENTION

Figure 1:
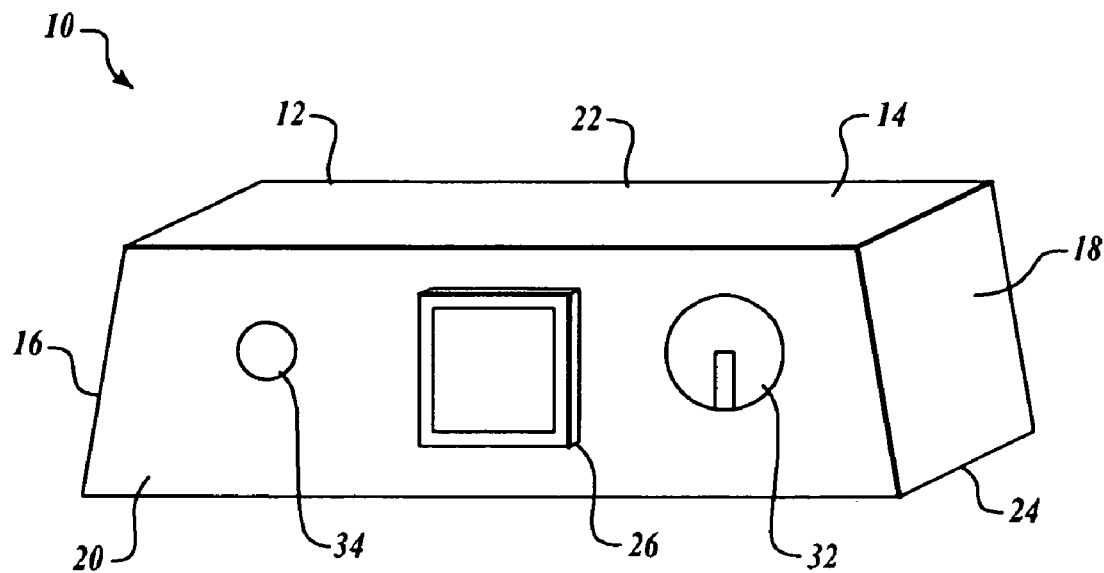
FIG. 1 is a front perspective view showing one embodiment of the computer disconnect device invention of the present invention.
Figure 2:
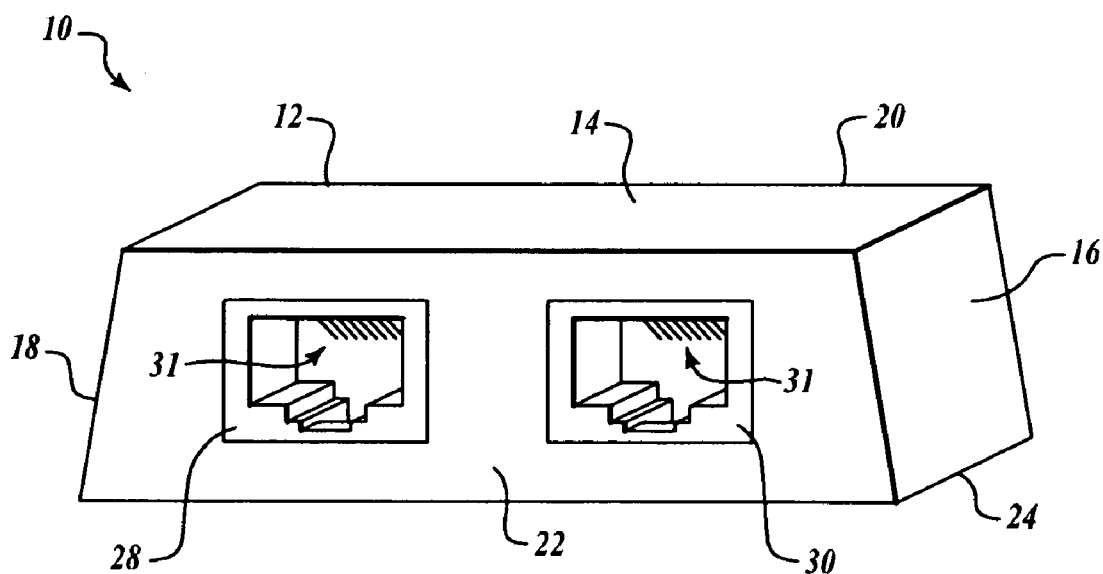
FIG. 2 is a rear perspective view thereof.
Figure 6:
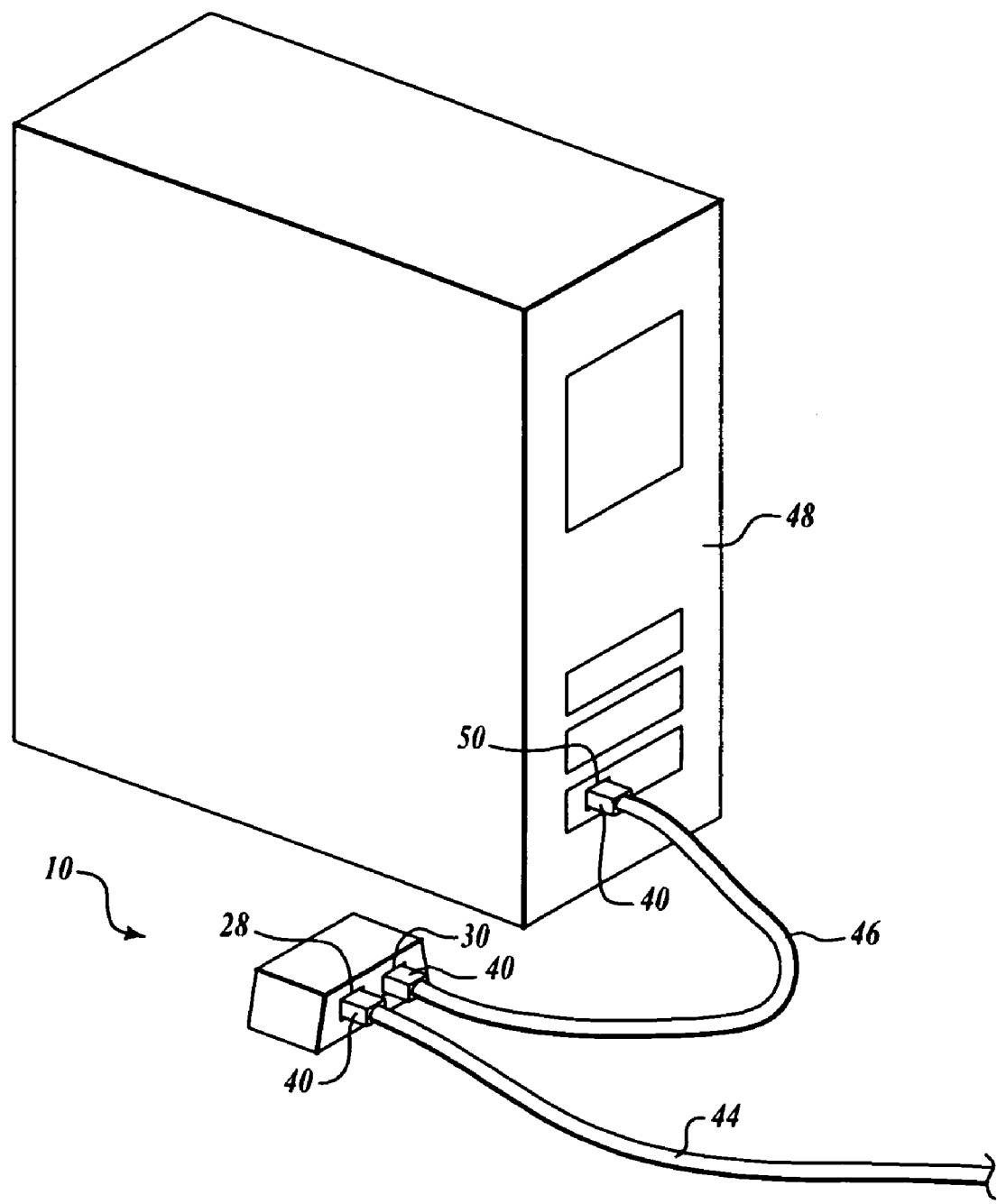
FIG. 6 is a diagrammatic perspective view showing the present invention connected to an external communications cable and to a computer.

Referring now to FIGS. 1, 2 and 6, the computer disconnect device 10 of the present invention for computer 48 may comprise a housing 12 having a top 14, side walls 16, 18, front and back walls 20, 22, and a bottom 24. Mounted to the housing 12 in any suitable way may be a switch 26; a conventional female RJ-45 Ethernet "external" communications cable connector 28 for providing a connection with an "external" Ethernet communications cable 44; a conventional female RJ-45 Ethernet "jumper" communications cable connector 30 for providing a connection with a "jumper" Ethernet communications cable 46; an optional lock 32; and an optional status indicator 34.

The "external" Ethernet communications cable 44 may provide a connection between the computer disconnect device 10 and any suitable external network, such as the Internet or to an intranet; while the "jumper" Ethernet communications cable 46 may provide a connection between the computer disconnect device 10 and the computer 48.

Although the switch 26, lock 32, and status indicator 34 are illustrated as being mounted in the front wall 20, and although the communications cable connectors 28, 30 are illustrated as being mounted in the back wall 22, any of those components may be mounted in any suitable location in other suitable surface of the housing 12.

The bottom 24 (or any other part(s) of the housing 12) may be made as a separate piece that may then be secured to the rest of the housing 12 in any suitable way, such as by the use of fasteners, bonding, gluing, a friction fit, or interlockable corresponding parts, for example. The housing 12 may be made of any synthetic or natural material, such as plastic, metal or wood, for example; and may be made in any suitable way, such as by injection molding, thermoforming, or stamping, for example.

The housing 12 may be of any suitable size and shape, and may be, for example, about 2.5 inches long between side walls 16, 18, about 2 inches deep between front and back walls 20, 22 and about 0.75 inches high between top and bottom 14, 24. Alternatively, the housing 12 may have any other desired regular or irregular geometric shape(s); and all of the parts 14, 16, 18, 20, or 22 may not be separately recognizable, such as if the housing 12 had a hemispherical shape.

The housing 12 may have a contact surface (e.g., its bottom 24), that may be sized and shaped in such a way so as to enable the contact surface to be able to easily sit on, or to be easily attached to, any suitable supporting surface of another object, such as a computer, monitor, keyboard, desk, or wall, for example.

The housing 12's contact surface may be selected to have a shape that corresponds to the shape of the selected supporting surface of another object. Corresponding shapes are shapes that fit at least reasonably closely together. For example if the shape of the selected supporting surface was spherical, then the corresponding shape of the housing 12's contact surface may be spherically concave, in order to at least reasonably closely match the shape of the spherical supporting surface.

If desired, the computer disconnect 10 may be permanently, or releasably, attached to the selected supporting surface of another object. Such attachment may be accomplished by using any suitable attachment means, such as by using, for example, adhesive, double-sided sticky tape, hook and loop fastening material (e.g., Velcro), magnetic material, suction devices (e.g., a suction cup), magnetic material, or fasteners.

Whenever the computer disconnect device 10 is intended to sit on any suitable supporting surface (rather than being attached to that supporting surface), the computer disconnect device 10 may be selected to weigh enough, and the contact surface of its housing 12 (e.g., its bottom 24), may be provided with a selected friction contact surface, so that the computer disconnect 10 does not move an inconvenient (i.e., a substantial) amount when its switch 26 is actuated to its switch-on or switch-off status. For example, the computer disconnect device 10 may be selected to weight at least about one pound, more or less, and its housing 12 have a friction bottom 24 made from any suitable, relatively high coefficient of friction material, such as soft rubber.

As a further alternative, part or all of the computer disconnect device's housing 12 may be eliminated, and part or all of the switch 26, communications cable connectors 28, 30, external and jumper wiring 33, lock 32 and indicator 34 may be wholly or partially located, in any suitable way, within the housing of any other suitable device, such as a computer, computer keyboard, or monitor, for example.

For example, if the computer disconnect device 10 is wholly mounted in a keyboard, then its housing 12 may be eliminated, its RJ-45 communications cable connectors 28, 30 may be mounted so as to be accessible from the rear of the keyboard, its switch 26, lock 32 and indicator 34 may mounted so as to be accessible from the top surface of the keyboard, and its external and jumper wiring 33 may be mounted within the keyboard.

Figure 3:
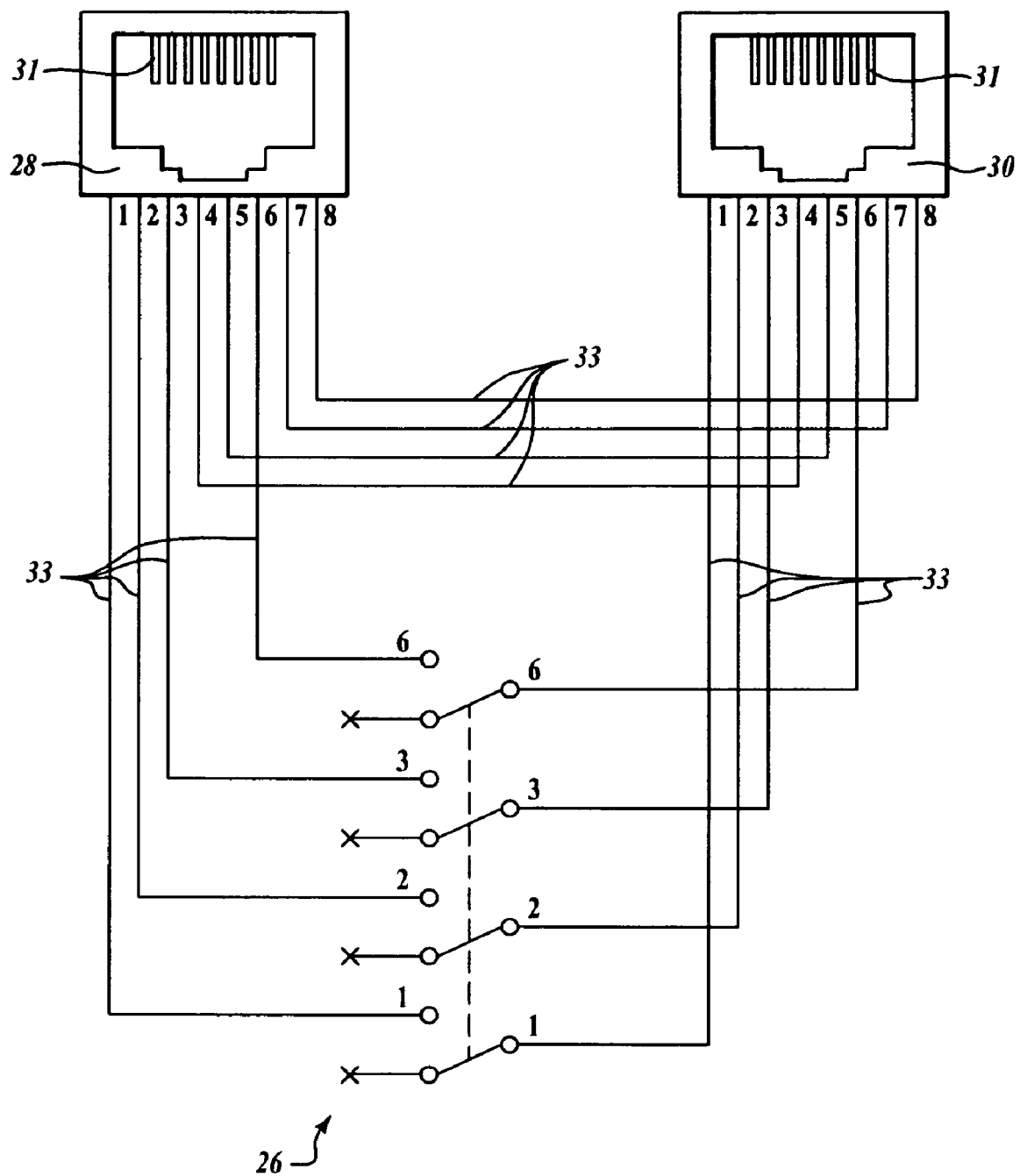
FIG. 3 is an electrical schematic showing one embodiment of the electrical circuitry for the present invention.

Turning now to FIG. 3, it illustrates one embodiment of the electrical circuitry for the computer disconnect device 10. As seen, each female RJ-45 Ethernet communications cable connector 28, 30 may have eight pins 31, which may be conventionally numbered from 1 to 8 from left to right as seen when facing the communications cable connectors 28, 30. Each pin 31 may be connected to wiring, namely to a respectively numbered wire 33, as seen in FIG. 3. The wires 33 may take any suitable form, such as actual wires, or circuitry on a printed circuit board, for example.

For signaling rates of up to about 100 megabits per second (Mbps), only four of the eight pins 31 in communications cable connectors 28, 30 may be conventionally used to carry signals, namely their respective pins 31 numbered 1, 2, 3 and 6. As seen in FIG. 3, pins 31 numbered 1, 2, 3 and 6 of the "external" communications cable connector 28 may be connected by their respective "external" wiring (i.e., by "external" wires 33 numbered 1, 2, 3 and 6) to correspondingly numbered terminals on the "external" side (left side) of the switch 26. As is also seen in FIG. 3, pins 31 numbered 1, 2, 3 and 6 of the "jumper" communications cable connector 30 may be connected by their respective "jumper" wiring (i.e., by "jumper" wires 33 numbered 1, 2, 3 and 6) to correspondingly numbered terminals on the "jumper" side (right side) of the switch 26.

As is also seen in FIG. 3, for signaling rates up to about 100 Mbps, pins 31 numbered 4, 5, 7 and 8 of the female communications cable connectors 28, 30 may be wired directly together with their respective wiring, namely wires 33 numbered 4, 5, 7 and 8, rather than being wired to respective terminals on switch 26. This may be done for several reasons. For example, even though pins 31 numbered 4, 5, 7 and 8 may not be used to carry input or output signals, their corresponding wires 38 in the Ethernet cables 44, 46 (see FIGS. 4 and 6) that may be connected to communications cable connectors 28, 30, respectively, may still have an influence on the quality of the signals in the Ethernet cables 44, 46. As a result, the Ethernet cables 44, 46 may need to be properly terminated on both of their respective ends regarding pins numbered 4, 5, 7 and 8 in order to maintain the integrity of the signals carried by the cables 44, 46. Wiring pins 31 numbered 4, 5, 7 and 8 directly together as shown in FIG. 3 may eliminate the need to incorporate in the invention the complex termination networks for the Ethernet cables 44, 46 that might otherwise be needed.

In addition, another reason for wiring pins 31 numbered 4, 5, 7 and 8 directly together as shown in FIG. 3 is that one variant of Power Over Ethernet (PoE) sends DC power over the wires 38 connected to pins numbered 4, 5, 7, and 8; and such wiring may help make the network switch that may be used with Ethernet cables 44, 46 compatible with that type of PoE equipment.

The switch 26 may be any suitable mechanical, electro-mechanical, electrical, or software-driven switch. The switch 26 may have an "on" status in which the "external" wiring (i.e., "external" wires 33 for pins 31 numbered 1, 2, 3, and 6 of the "external" communications cable connector 28) are electrically connected by the switch 26 to the corresponding "jumper" wiring (i.e., "jumper" wires 33 for pins 31 numbered 1, 2, 3, and 6 of the "jumper" communications cable connector 30). The switch 26 may also have an "off" status in which the switch 26 disconnects the "external" wiring from the corresponding "jumper" wiring. Suitable mechanical switches may be, for example, any suitable push "on" and push "off" switch, or any suitable slide "on" and slide "off" switch.

Regardless of whether the switch 26 is a mechanical, electromechanical, electrical, or software-driven type of switch, the computer disconnect device 10 may be equipped with any suitable mechanical, electro-mechanical, electrical or software-driven status indicator 34 that has a switch-on status indication when the switch 26 is in a switch-on status, and that has a switch-off status indication when the switch 26 is in a switch-off status. As indicated earlier, the status indicator 34 may be optional.

For example, if the switch 26 is a conventional mechanical slide "on", slide "off" switch 26, then the status indicator 34 may be a status indicator hole in the housing 12's front wall 20 through which a differently colored, status indicator part of the switch 26's slide may be visible, depending on whether the switch 26 is "on" or "off". For example, the switch-on status indication may be a green status indicator part of the switch 26's slide that may be visible through the status indicator hole when the switch 26 is slid to its "on" status, and the switch-off status indication may be a red status indicator part of the switch 26's slide that may be visible through the status indicator hole when the switch 26 is "off".

By way of further example, if the status indicator 34 is electrical in nature, it may comprise any suitable light source, such as a light emitting diode (LED) or an incandescent light; or it may comprise any suitable display, such as a liquid crystal display. Such an electrical status indicator 34 may be powered in any suitable way, such as by a battery, and be electrically connected with the switch 26 in any suitable way so that, for example, it illuminates (or doesn't illuminate) or displays (or doesn't display) any suitable indicia to indicate a switch-on status indication when the switch 26 is "on", and so that it does not illuminate (or illuminates) or doesn't display (or displays) any suitable indicia to indicate a switch-off status indication when the switch 26 is "off". The switch 26 may, or may not, be provided with separate terminals for the status indicator 34 and its battery or other power supply.

The optional lock 32 may be operable for controlling the function of the switch 26, and may comprise any suitable mechanical, electromechanical, electrical, or software-driven lock having at least an "unlocked" status and a "locked" status. For example, in the lock 32's "unlocked" status, the switch 26 may be turned "on" if it is in its "off" state, it may be turned "off" if it is in its on" state, or it may be permitted to be turned to either its "on" or "off" states. By way of further example, in the lock 32's "locked" status, the switch 26 may be prevented from being turned "on" if it is in its "off" state, it may be prevented from being turned "off" if it is in its "on" state, or it may be prevented from being turned either "on" or "off".

Figure 4:
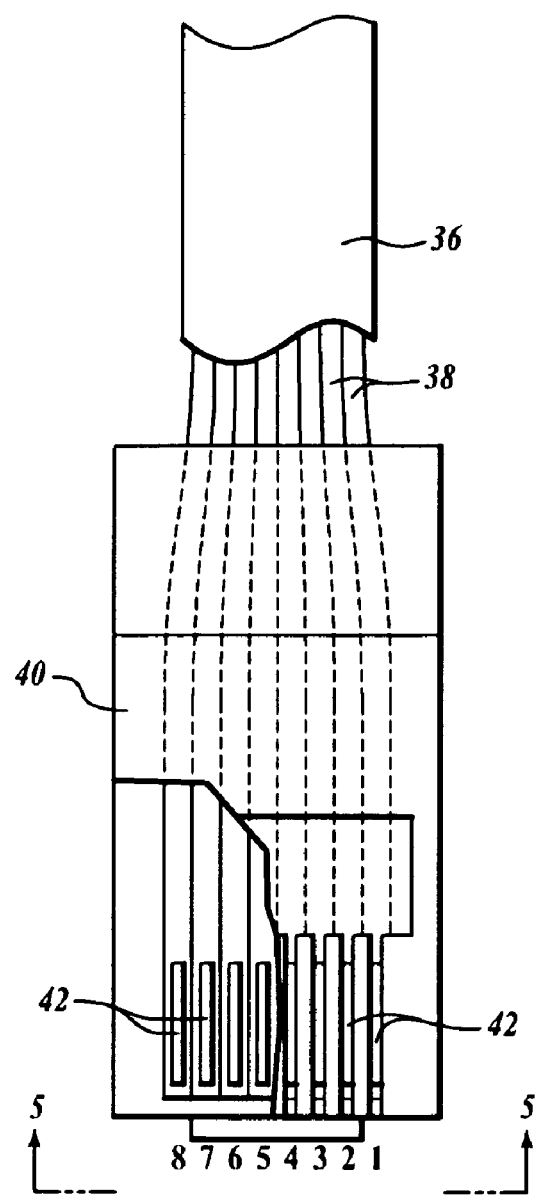
FIG. 4 is a top plan view of an Ethernet cable having a male RJ-45 communications cable connector at one end thereof, with the view being partly broken away in certain areas to show internal features.
Figure 5:
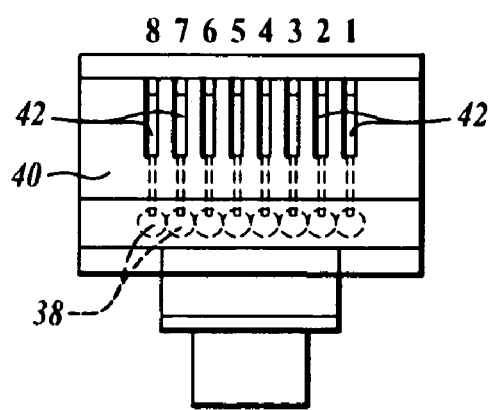
FIG. 5 is an end elevational view of FIG. 4, taken along line 5—5 thereof.

Turning now to FIGS. 4 and 5, they illustrate a conventional Ethernet communications cable 36 having eight wires 38, and having a male RJ-45 Ethernet communications cable connector 40 at one end that is equipped with eight pins 42 that are conventionally numbered 1–8 as seen. Each of the wires 38 may be connected to a respective one of the pins 42, as seen. When a male RJ-45 Ethernet communications cable connector 40 of an Ethernet communications cable 36 is plugged into a female RJ-45 Ethernet communications cable connector (e.g., communications cable connectors 28, 30), its respective eight wires 38 numbered 1–8 are connected through their respective eight pins 42 numbered 1–8 to their corresponding respective eight pins 31 numbered 1–8 of the female RJ-45 Ethernet communications cable connector.

The "external" Ethernet communications cable 44 of FIG. 6 may be of the same construction as the Ethernet communications cable 36 illustrated in FIGS. 4 and 5, and may have male RJ-45 Ethernet communications cable connector 40 at one of its ends. The "jumper" Ethernet communications cable 46 of FIG. 6 may also be of the same construction as the Ethernet communications cable 36 illustrated in FIGS. 4 and 5, and may have a male RJ-45 Ethernet communications cable connector 40 at both of its ends.

The connection and use of the computer disconnect device 10 will now be addressed. As seen in FIG. 6, in order to connect the computer disconnect device 10 two connections may need to be made. The first connection may be that the male RJ-45 Ethernet communications cable connector 40 from an "external" Ethernet communications cable 44 may be plugged into the computer disconnect device 10's female RJ-45 Ethernet "external" communications cable connector 28. The second connection may be that a "jumper" Ethernet communications cable 46, having a male RJ-45 Ethernet communications cable connector 40 at each end, may have one of its communications cable connectors 40 plugged into the computer disconnect device 10's female RJ-45 Ethernet "jumper" communications cable connector 30, and its other communications cable connector 40 plugged into a computer 48's communications port, such as a female RJ-45 Ethernet communications cable connector 50.

In order to use the computer disconnect device 10, if the switch 26 is actuated to its "on" status, then the respective "external" and "jumper" wires 33 attached to respective pins 31 numbered 1, 2, 3 and 6 of the computer disconnect device 10's female RJ-45 Ethernet "external" communications cable connector 28 and "jumper" communications cable connector 30 will be connected to each other through switch 26. As a result, the computer 48 will be connected to the external Ethernet communications cable 44 through its female RJ-45 Ethernet communications cable connector 50, the "jumper" Ethernet communications cable 46, the female Ethernet "jumper" communications cable connector 30, the "jumper" wires 33, the switch 26, the "external" wires 33, and the female Ethernet "external" communications cable connector 28.

If an optional lock 32 has been provided, then it may first have to be actuated from its "locked" status to its "unlocked" status, in order to permit the switch 26 to be actuated to its "on" status. If an optional status indicator 34 has been provided, then it may indicate that the switch 26 is in its "on" status.

Similarly, if the switch 26 is actuated to its "off" status, then the computer 48 will be disconnected from the external Ethernet communications cable 44 because the switch 26 will disconnect from each other the respective "external" and "jumper" wires 33 attached to respective pins 31 numbered 1, 2, 3 and 6 of the computer disconnect device 10's female Ethernet "external" and "jumper" communications cable connectors 28, 30.

If an optional lock 32 has been provided, then it may first have to be actuated from its "locked" status to its "unlocked" status, in order to permit the switch 26 to be actuated to its "off" status. If an optional status indicator 34 has been provided, then it may indicate that the switch 26 is in its "off" status. If it is desired to prevent an unauthorized user from actuating the switch 26 back to its "on" status, then the optional lock 32 may be actuated to its "locked" status.

Another aspect of the present invention may be to use the computer disconnect device 10 with an "external" Ethernet communications cable 44 having signaling rates of up to about 1,000 Mbps. The construction, connection, use and operation of such a computer disconnect device 10 would be the same as, or at least similar to, the construction, connection, use and operation of the computer disconnect device 10 described above regarding signaling rates of up to about 100 Mbps, except for those differences that will be made apparent to one of ordinary skill in the art in view of all of the disclosures herein.

For example, for signaling rates of up to about 1,000 Mbps, all eight of the wires 38 in the "external" Ethernet communications cable 44 may be used to carry signals, and may be connected to respective pins 42 numbered 1–8 in a male Ethernet communications cable connector 40. In addition, a switch 26 may be used that has eight terminals numbered 1–8 on its "external" (left) side, and eight terminals numbered 1–8 on its "jumper (right) side.

In such an event, the respective eight "external" wires 33 numbered 1–8 of the female Ethernet "external" communications cable connector 28 may be connected to the corresponding eight terminals numbered 1–8 on the switch 26's "external" side; and the respective eight "jumper" wires 33 numbered 1–8 of the female Ethernet "jumper" communications cable connector 30 may be connected to the corresponding eight terminals numbered 1–8 on the switch 26's "jumper" side. Thus, when the switch 26 is actuated to its "on" status, the respective "external" and "jumper" wires 33 of the female Ethernet "external" and "jumper" communications cable connectors 28, 30 are connected to each other respectively; and when the switch 26 is actuated to its "off" status the respective "external" and "jumper" wires 33 of the female Ethernet "external" and "jumper" communications cable connectors 28, 30 are disconnected from each other respectively.

The above construction for the computer disconnect device 10 when used with an "external" Ethernet communications cable 44 having signaling rates of up to about 1,000 Mbps has not been illustrated in FIG. 3 for clarity, since a person of ordinary skill in the art would be easily able to wire construct, connect and use such a computer disconnect device 10 in view of all of the disclosures herein.

Turning now to FIG. 7, it illustrates a conventional female RJ-11 telephony (dial-up) communications cable connector 52, which may have from two to six pins 54. The pins 54 may be conventionally numbered from 1–6 from left to right as seen when facing the female telephony communications cable connector 52. Conventionally, only the center pins 54 numbered 3 and 4 are used for communications purposes. Accordingly, a conventional female RJ-11 telephony communications cable connector 52 may be used which has as few as two pins 54 numbered 3 and 4, regardless of whether one or more of the other pins 54 numbered 1, 2, 5 and 6 are provided by the female communications cable connector 52.

Turning now to FIGS. 8–9, they illustrate a conventional telephony communications cable 56. The telephony communications cable 56 may have from two to six wires 58, each connected to a respectively numbered pin 60 in a conventional male RJ-11 telephony communications cable connector 62. However, only the two wires 58 connected to respective pins 60 numbered 3 and 4 are conventionally used for communications purposes. Accordingly, a telephony communications cable 56 and male telephony communications cable connector 62 may be used which have as few as two wires 58 (i.e., numbered 3 and 4) connected to as few as two pins 60 (i.e., numbered 3 and 4), regardless of whether one or more of the other wires 58 and pins 60 numbered 1, 2, 5 and 6 are provided by the communications cable 56 and male communications cable connector 62.

Another aspect of the present invention may be to provide a computer disconnect device 10a in which the "external" Ethernet communications cable 44 for the computer disconnect device 10 of FIGS. 1–6 may be replaced by an "external" telephony communications cable 44a. The construction, connection, use and operation of such a computer disconnect device 10a may be the same as, or at least similar to, the construction, connection, use and operation of the computer disconnect device 10 of FIGS. 1–6, except for those differences that will be made apparent to one of ordinary skill in the art in view of all of the disclosures herein.

For example, the "external" telephony communications cable 44a of the computer disconnect device 10a may comprise a telephony communications cable 56 having at least two wires 58 numbered 3 and 4, and having a male RJ-11 "external" communications cable connector 62 at one end having at least two pins 60 numbered 3 and 4 that are connected to wires 3 and 4, respectively. The "jumper" Ethernet communications cable 46 for the computer disconnect device 10 may be replaced by a "jumper" telephony communications cable 46a for the computer disconnect device 10a that comprises a telephony communications cable 56 having at least two wires 58 numbered 3 and 4, and having a male RJ-11 "jumper" communications cable connector 62 at each of its ends, with each "jumper" communications cable connector 62 having at least two pins 60 numbered 3 and 4 that are connected to wires 3 and 4, respectively.

In addition, the female Ethernet RJ-45 "external" and "jumper" communications cable connectors 28, 30 for the computer disconnect device 10 may be replaced by female telephony RJ-11 "external" and "jumper" communications cable connectors 28a, 30a for the computer disconnect device 10a, with each "jumper" communications cable connector 28a, 28b, having as few as two pins 54 numbered 3 and 4.

Further, the switch 26 for the computer disconnect device 10 may be replaced by a switch 26a for the computer disconnect device 10a, with the switch 26a having at least two terminals numbered 3 and 4 on its "external" (left) side and at least two terminals numbered 3 and 4 on its "jumper" (right) side. Respective "external" wires 33a may be used to connect pins 54 numbered 3 and 4 of the female "external" communications cable connector 28a to the corresponding terminals numbered 3 and 4 on the "external" side of switch 26a; and respective "jumper" wires 33a may be used to connect pins 54 numbered 3 and 4 of the female "jumper" communications cable connector 30a to the corresponding terminals numbered 3 and 4 on the "jumper" side of switch 26a. The computer disconnect device 10a may include an optional lock 32 and an optional status light 34.

The above construction for the computer disconnect device 10a has not been illustrated in FIGS. 1–3 and 6 for clarity, since a person of ordinary skill in the art would be easily able to wire, construct, connect and use such a computer disconnect device 10a in view of all of the disclosures herein.

In order to connect the computer disconnect device 10a, the "external" telephony communications cable 44a's male RJ-11 "external" communications cable connector 62 may be plugged into the computer disconnect device 10a's female RJ-11 "external" communications cable connector 28a; one of the male RJ-11 "jumper" communications cable connectors 62 of the "jumper" telephony communications cable 46a may be plugged into the computer disconnect device 10a's female RJ-11 "jumper" communications cable connector 30a; and the other of the male RJ-11 "jumper" communications cable connectors 62 of the "jumper" telephony communications cable 46a may be plugged into the computer 48's female RJ-11 "jumper" communications cable connector 50a (which replaces the female RJ-45 Ethernet "jumper" communications cable connector 50 illustrated in FIG. 6.).

In order to use the computer disconnect device 10a, when its switch 26a is actuated to its "on" status, then the respective "external" and "jumper" wires 33a of the female telephony "external" and "jumper" communications cable connectors 28a, 30a are connected to each other respectively (thereby connecting the computer 48 to the "external" telephony communications cable 44a); and when the switch 26a is actuated to its "off" status, then the respective "external" and "jumper" wires 33a of the female telephony "external" and "jumper" communications cable connectors 28a, 30a are disconnected from each other respectively (thereby disconnecting the computer 48 from the "external" telephony communications cable 44a).

The construction and use of the optional lock 32 and optional status indicator 34 of the computer disconnect device 10a may be the same as, or at least similar to, their construction and use in the computer disconnect device 10.

For the computer disconnect device 10, any mating pair of female and male RJ-45 Ethernet communications cable connectors may be reversed; i.e., the female RJ-45 Ethernet communications cable connector may be replaced by a male RJ-45 Ethernet communications cable connector, and the corresponding male RJ-45 Ethernet communications cable connector may be replaced by a female RJ-45 communications cable connector, and vice versa. For example, the "external" Ethernet communications cable 44 may have a female RJ-45 Ethernet "external" communications cable connector 28 on one of its ends (vice a male RJ-45 Ethernet "external" communications cable connector 40); and the computer disconnect device 10 may have a male RJ-45 Ethernet "external" communications cable connector 40 (vice a female RJ-45 Ethernet "external" communications cable connector 28).

Similarly, for the computer disconnect device 10a, any mating pair of female and male RJ-11 telephony communications cable connectors may be reversed; i.e., the female RJ-11 telephony communications cable connector may be replaced by a male RJ-11 telephony communications cable connector, and the corresponding male RJ-11 telephony communications cable connector may be replaced by a female RJ-11 telephony communications cable connector. For example, the "external" telephony communications cable 44a may have a female RJ-11 telephony "external" communications cable connector 28a on one of its ends (vice a male RJ-11 telephony "external" communications cable connector 62); and the computer disconnect device 10a may have a male RJ-11 telephony "external" communications cable connector 62 (vice a female RJ-11 telephony "external" communications cable connector 28a).

Although the computer disconnect devices 10, 10a, have been discussed herein as being used with respect to conventional "external" Ethernet and telephony communications cables 44, 44a, and conventional "jumper" Ethernet and telephony communications cables 46, 46a, it is to be understood that the scope of the present invention includes the computer disconnect devices 10, 10a being constructed for use with any other conventional or non-conventional communications cables over which information may be sent or received. For example, such other communications cables may be optical cables having one or more optical strands carrying information; or the communications cables may have conventional wires, but have different numbers of wires used for carrying information than the number of wires used in conventional Ethernet and telephony communications cables; or such other communications cables may use communications protocols that are different, in whole or in part, from the protocols used with conventional Ethernet and telephony communications cables, or such other communication cables may use different male, female, or other types of communications cable connectors for connecting such other communication cables. A person of ordinary skill in the art would be able to easily make a computer disconnect 10, 10a that was useable with such other communications cables, in view of all of the disclosures herein.

For example, for a computer disconnect device 10b useable with an "external" optical communications cable 44b, and a "jumper" optical communications cable 46b, any suitable male and female optical communications cable connectors may be used in such a computer disconnect device 10b in lieu of the male and female RJ-45 and RJ-11 communications cable connectors described herein with respect to the computer disconnect devices 10 and 10a. Similarly, any suitable optical on and off switch 26b may be used in lieu of the switch 26 of the computer disconnect devices 10, 10a, and any suitable optical "external" and "jumper" wiring 33b may be used in lieu of the "external" and "jumper" wiring 33, 33a for the computer disconnect devices 10, 10a.

As used herein, except in the claims, the words "and" and "or" are each defined to also carry the meaning of "and/or".

When the term "at least one of" is used in any of the claims, that term is defined to mean that any one, any more than one, or all, of the listed things following that term is, or are, part of the claimed invention. For example, if a hypothetical claim recited "at least one of A, B, and C", then the claim is to be interpreted so that it may comprise (in addition to anything else recited in the claim), an A alone, a B alone, a C alone, both A and B, both A and C, both B and C, or all of A, B and C.

It is understood that the foregoing forms of the invention were described and illustrated strictly by way of non-limiting example.

In view of all of the disclosures herein, these and further modifications, adaptations and variations of the present invention will now be apparent to those of ordinary skill in the art to which it pertains, within the scope of the following claims.

What is claimed is:

1. A computer disconnect device comprising:
an external communications cable connector;
a jumper communications cable connector;
a switch;
external wiring operable to connect together said switch and said external communications cable connector; and
and jumper wiring operable to connect together said switch and said jumper communications cable connector;
wherein said external communications cable connector is adapted to be connected to an external communications cable;
wherein said jumper communications cable connector is adapted to be connected to a communications port of a computer by a jumper communications cable;
wherein said switch is operable to be selectively actuated between a switch-on status and a switch-off status;
wherein, when said switch is selectively actuated to said switch-on status, said switch is operable to connect together said external communications cable connector and said jumper communications cable connector by connecting together said external wiring and said jumper wiring, to enable said communications port of said computer to be connected to said external communications cable via said jumper communications cable, said jumper communications cable connector, said jumper wiring, said switch, said external wiring, and said external communications cable connector; and
wherein, when said switch is selectively actuated to said switch-off status, said switch is operable to disconnect from each other said external communications cable connector and said jumper communications cable connector by disconnecting from each other said external wiring and said jumper wiring, to enable said communications port of said computer to be disconnected from said external communications cable.

2. The computer disconnect device of claim 1, wherein said computer disconnect device further comprises a lock for said switch;
wherein said lock is operable to be selectively actuated between a lock-on status and a lock-off status;
wherein, when said lock is selectively actuated to said lock-on status, said lock is operable to prevent said switch from being selectively actuated from said switch-off status to said switch-on status; and
wherein, when said lock is selectively actuated to said lock-off status, said lock is operable to permit said switch to be selectively actuated from said switch-off status to said switch-on status.

3. The computer disconnect device according to claim 1, wherein said computer disconnect device further comprises a status indicator for said switch;
wherein said status indicator has a switch-on status indication and a switch-off status indication;
wherein, when said switch is selectively actuated to said switch-on position, said status indicator indicates said switch-on status indication; and
wherein, when said switch is selectively actuated to said switch-off position, said status indicator indicates said switch-off status indication.

4. The computer disconnect device according to claim 1, wherein said external communications cable comprises an Ethernet external communications cable; wherein said external communications cable connector comprises an Ethernet external communications cable connector; wherein said jumper communications cable comprises an Ethernet jumper communications cable; and wherein said jumper communications cable connector comprises an Ethernet jumper communications cable connector.

5. The computer disconnect device of claim 4, wherein said Ethernet external communications cable, said Ethernet external communications cable connector, said Ethernet jumper communications cable, and said Ethernet jumper communications cable connector are operable to carry signaling rates of up to about one hundred megabits per second.

6. The computer disconnect device according to claim 5, wherein said Ethernet external communications cable and said Ethernet jumper communications cable each comprise at least four wires;
wherein said Ethernet external communications cable connector and said Ethernet jumper communications cable connector each comprise at least four pins;
wherein said external wiring and said jumper wiring each comprise at least four wires;
wherein said switch comprises at least four external terminals and at least four jumper terminals;
wherein said at least four wires of said external wiring are connected between respective ones of said at least four pins of said Ethernet external communications cable connector and corresponding respective ones of said at least four external terminals of said switch; and
wherein said at least four wires of said jumper wiring are connected between respective ones of said at least four pins of said Ethernet jumper communications cable connector and corresponding respective ones of said at least four jumper terminals of said switch.

7. The computer disconnect device of claim 4, wherein said Ethernet external communications cable, said Ethernet external communications cable connector, said Ethernet jumper communications cable, and said Ethernet jumper communications cable connector are operable to carry signaling rates of up to about one thousand megabits per second.

8. The computer disconnect device according to claim 7, wherein said Ethernet external communications cable and said Ethernet jumper communications cable each comprise at least eight wires;
wherein said Ethernet external communications cable connector and said Ethernet jumper communications cable connector each comprise at least eight pins;
wherein said external wiring and said jumper wiring each comprise at least eight wires;
wherein said switch comprises at least eight external terminals and at least eight jumper terminals;
wherein said at least eight wires of said external wiring are connected between respective ones of said at least eight pins of said Ethernet external communications cable connector and corresponding respective ones of said at least eight external terminals of said switch; and
wherein said at least eight wires of said jumper wiring are connected between respective ones of said at least eight pins of said Ethernet jumper communications cable connector and corresponding respective ones of said at least eight jumper terminals of said switch.

9. The computer disconnect device according to claim 1, wherein said external communications cable comprises a telephony external communications cable; wherein said external communications cable connector comprises a telephony external communications cable connector; wherein said jumper communications cable comprises a telephony jumper communications cable; and wherein said jumper communications cable connector comprises a telephony jumper communications cable connector.

10. The computer disconnect device according to claim 9, wherein said telephony external communications cable and said telephony jumper communications cable each comprise at least two wires;
   wherein said telephony external communications cable connector and said telephony jumper communications cable connector each comprise at least two pins;
   wherein said external wiring and said jumper wiring each comprise at least two wires;
   wherein said switch comprises at least two external terminals and at least two jumper terminals;
   wherein said at least two wires of said external wiring are connected between respective ones of said at least two pins of said telephony external communications cable connector and corresponding respective ones of said at least two external terminals of said switch; and
   wherein said at least two wires of said jumper wiring are connected between respective ones of said at least two pins of said telephony jumper communications cable connector and corresponding respective ones of said at least two jumper terminals of said switch.

11. The computer disconnect device according to claim 1, wherein said computer disconnect device further comprises a housing; and wherein at least one of said external communications cable connector, said jumper communications cable connector, said switch, said external wiring, and said jumper wiring are at least partially enclosed in said housing.

12. The computer disconnect device according to claim 11, wherein said housing is adapted to be supported by a support surface of an object; and wherein said housing comprises at least one contact surface that has a shape selected to correspond to a shape of said support surface of said object.

13. The computer disconnect device according to claim 11, wherein said computer disconnect device further comprises attachment means for attaching said housing to a support surface of an object.

14. The computer disconnect device according to claim 11, wherein said computer disconnect device has a weight; wherein said housing comprises a friction contact surface that is adapted to be supported by a support surface of an object; and wherein said weight and said friction contact surface are selected to at least partially prevent said computer disconnect device from moving substantially on said support surface of said object when said switch is actuated.

15. The computer disconnect device according to claim 1; wherein said computer disconnect device is adapted to be used with an object having a housing; and wherein at least one of said external communications cable connector, said jumper communications cable connector, said switch, said external wiring, and said jumper wiring are at least partially enclosed in said housing of said object.

* * * * *